(12) United States Patent
Samadani et al.

(10) Patent No.: US 6,906,643 B2
(45) Date of Patent: Jun. 14, 2005

(54) SYSTEMS AND METHODS OF VIEWING, MODIFYING, AND INTERACTING WITH "PATH-ENHANCED" MULTIMEDIA

(75) Inventors: Ramin Samadani, Menlo Park, CA (US); Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 190 days.

(21) Appl. No.: 10/427,649

(22) Filed: Apr. 30, 2003

(65) Prior Publication Data

US 2004/0217884 A1 Nov. 4, 2004

(51) Int. Cl.$^7$ .............................................. G08G 1/123
(52) U.S. Cl. .............................. 340/995.18; 340/995.1; 340/995.14; 701/200; 701/201
(58) Field of Search ......................... 340/995.18, 995.1, 340/995.14, 995.15, 995.16, 995.17, 995.24, 995.27; 701/200, 201, 205–207; 348/231.2, 231.3, 231.6

(56) References Cited

U.S. PATENT DOCUMENTS

| | | | |
|---|---|---|---|
| 5,296,884 A | | 3/1994 | Honda et al. |
| 5,422,814 A | | 6/1995 | Sprague et al. |
| 5,596,494 A | * | 1/1997 | Kuo ................................ 702/2 |
| 5,642,285 A | | 6/1997 | Woo et al. |
| 5,726,660 A | | 3/1998 | Purdy et al. |
| 5,926,116 A | * | 7/1999 | Kitano et al. ................ 340/988 |
| 6,144,375 A | | 11/2000 | Jain et al. |
| 6,173,239 B1 | | 1/2001 | Ellenby |
| 6,282,362 B1 | | 8/2001 | Murphy et al. |
| 6,504,571 B1 | | 1/2003 | Narayanaswami et al. |
| 6,564,263 B1 | * | 5/2003 | Bergman et al. ............. 709/231 |
| 2003/0024975 A1 | | 2/2003 | Rajasekharan |

FOREIGN PATENT DOCUMENTS

| | | |
|---|---|---|
| EP | 1054331 | 11/2000 |
| EP | 1128284 | 8/2001 |
| EP | 1139116 | 10/2001 |
| EP | 1139681 | 10/2001 |
| EP | 1146467 | 10/2001 |
| EP | 1158822 | 11/2001 |
| WO | WO9821688 | 5/1998 |
| WO | WO9854896 | 12/1998 |
| WO | WO9918732 | 4/1999 |
| WO | WO0072577 | 11/2000 |
| WO | WO0144978 | 6/2001 |
| WO | WO0154021 | 7/2001 |
| WO | WO0163479 | 8/2001 |
| WO | WO0233955 | 4/2002 |

* cited by examiner

Primary Examiner—Toan N. Pham

(57) ABSTRACT

"Path-enhanced" multimedia (PEM) data may be viewed, modified, or interacted with according to user selected views which determine the manner in which at least a portion of the PEM data is displayed. The PEM data is stored in a data structure as a scrapbook object including first data object types corresponding to the PEM data and second object types corresponding to the different view types. The scrapbook object data structure lends itself to displaying portions of the PEM data according to selected views that correspond to a particular time and place or to a particular time ordered sequence of locations (i.e., a particular path segment) and/or can be enhanced with other multimedia content related to that time and place or to that path segment, thereby providing a more interesting and effective display of the "path-enhanced" recorded events. For example, the time and location of a particular point on the path may be used to locate and append other recorded sounds and images associated with that time and/or that location, to thereby provide an enhanced presentation of a trip or other path-oriented experience. Moreover, the data defining any such associated path may also be edited to thereby define a new or modified path.

77 Claims, 8 Drawing Sheets

San Francisco In Two Days – January 2001 — 1A

Jan 1 – Monday — 6

- 9am — Audio (3:27min)
  - "My first impressions"
- 10:30am — Video (5min)
  - "Elephants at the zoo"
- 2:35pm — Photos (13)
  - "From Coit Tower"
- 10:35pm — Audio (6:07min)
  - "Why so foggy?"

Jan 2 – Tuesday — 6

- 10:00am — Audio (2:12min)
  - "Street musicians"
- 10:30am — Video (6:17min)
  - "First down Lombard"
- 11:00am — Stock photos (2)
  - "Best Pictures of Golden Gate"
- 6:13pm — Audio (3:01min)
  - Photo (3)
  - "Max's Opera House singers"

Jan 3 – Wednesday — 6

- 7:00am — Video (1:30min)
  - "Our plane is here" — 8
- 7:25am — Audio (3:00min)
  - Photos (5) — 9
  - "Take off!"
- 9:00am — Audio (6:00min)
  - "My thoughts about the trip: what to see next time"

Fig. 2

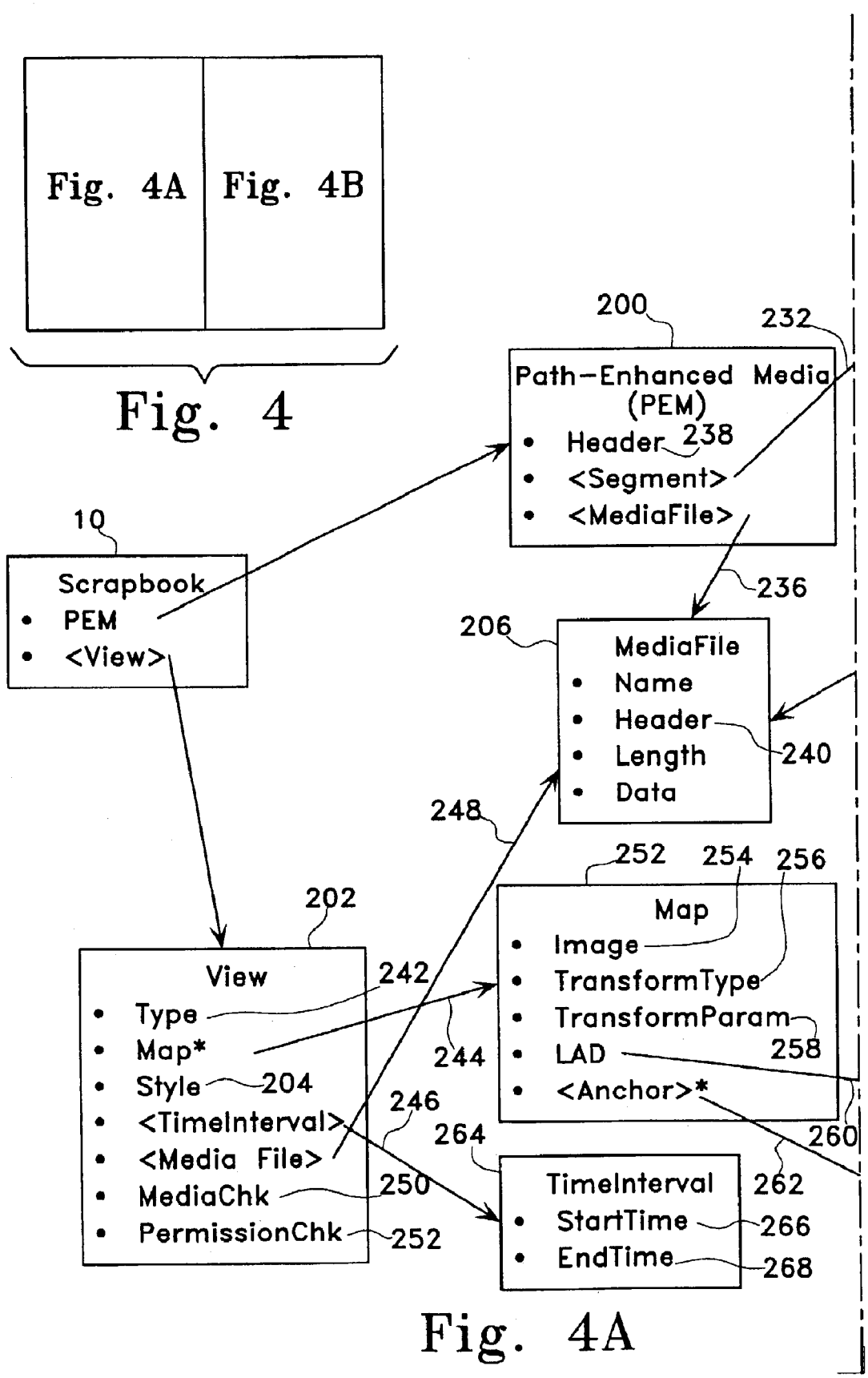

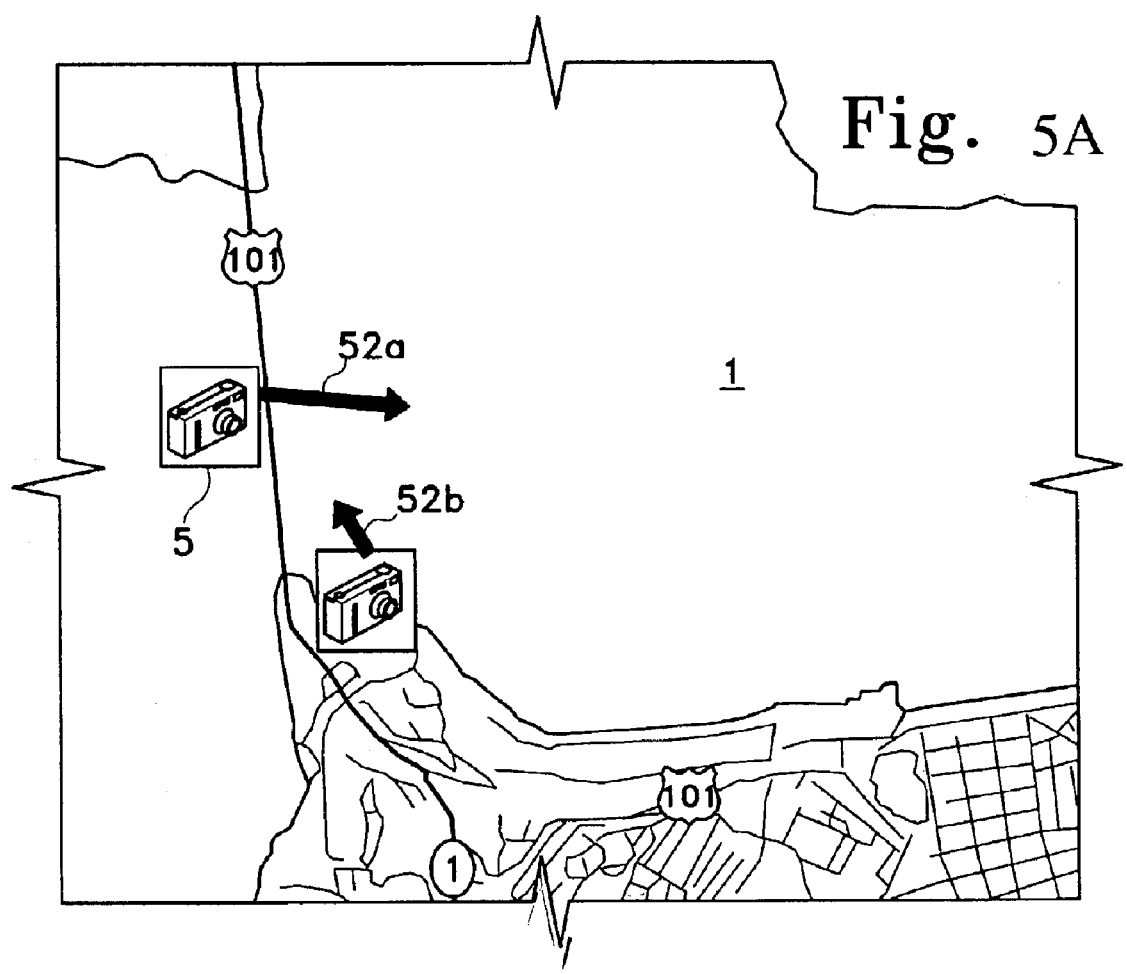

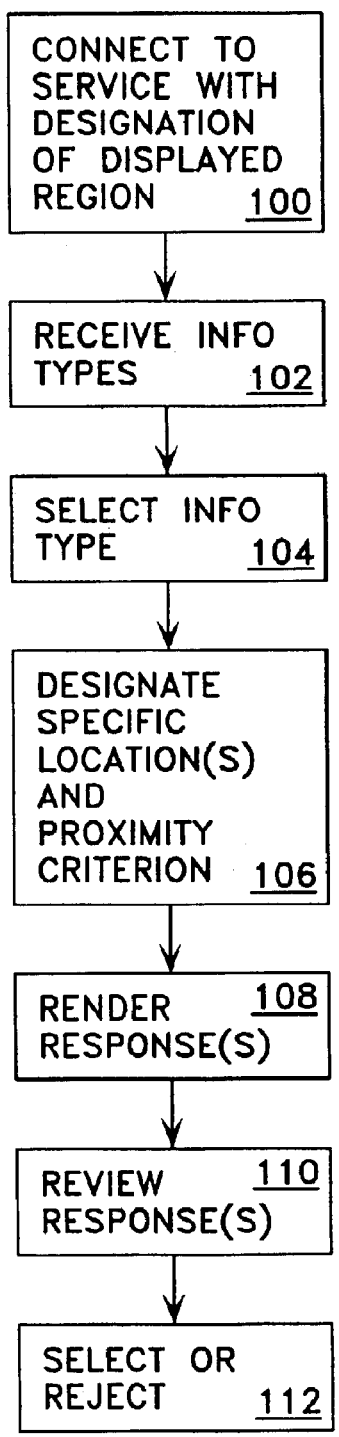
Fig. 6
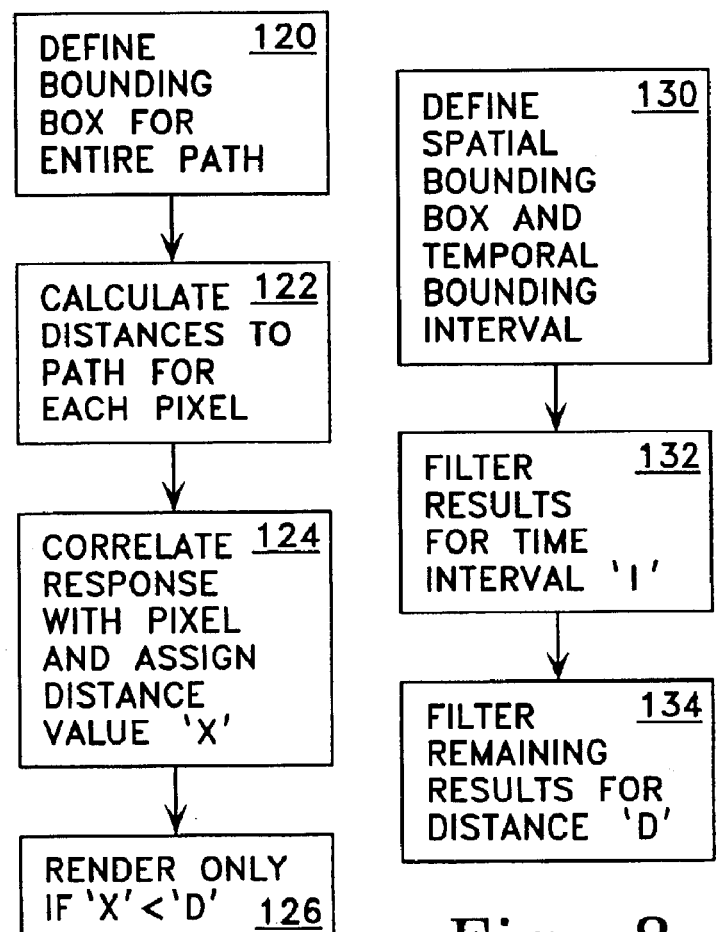
Fig. 7
Fig. 8

SYSTEMS AND METHODS OF VIEWING, MODIFYING, AND INTERACTING WITH "PATH-ENHANCED" MULTIMEDIA

CROSS-REFERENCE TO RELATED APPLICATIONS

Our commonly assigned patent application filed concurrently Ser. No. 10/427,614 "Apparatus and Method for Recording "Path-Enhanced" Multimedia" describes a novel multimedia recording appliance that can record multimedia such as audio, still images and/or video individually or in combinations, and that is capable of sampling time and position information whether or not it is recording any such multimedia, thereby providing a record not only of particular sounds, imagery and the like, but also of a path traveled during and between the recording of those sounds and/or imagery. The recorded data that this appliance generates are examples of "path-enhanced" multimedia, and the identified patent application is hereby incorporated by reference in its entirety.

Other commonly assigned patent applications filed concurrently herewith describe various other contemplated applications for "path-enhanced" multimedia technology, and each of the following identified patent applications is also hereby incorporated by reference in its entirety:

Ser. No. 10/427,582 "Automatic Generation of Presentations from "Path-Enhanced" Multimedia" relates to novel apparatus and methodology for generating a presentation of multimedia data together with an animated overview and/or a path-oriented context connecting those events.

Ser. No. 10/427,647 "Indexed Database Structures and Methods for Searching Path-Enhanced Multimedia" relates to novel database structures and data searching procedures suitable for recorded data having associated times and locations.

FIELD OF THE INVENTION

The present invention relates generally to recorded multimedia data associated with essentially continuously recorded path information, and more particularly this disclosure describes techniques of viewing, modifying, and interacting with the associated multimedia and path information.

BACKGROUND

Still and video digital images with attached GPS data from a known recording device may be processed using known web-based systems for generating web-enabled maps overlaid with icons for accessing such digital images. Although these systems provide GPS data for the images on an individual and unrelated basis, no information is provided relating to GPS data occurring at times other than when the images are captured. In addition, no information is provided relating to GPS data occurring along a continuous path between points of capture.

GPS-based navigation systems are known which display the user's current location relative to a calculated route between two predetermined points. There are also systems known that record and display a user's route.

In addition, there are known user interfaces for displaying photos in a map where the photos are shown on the map according to location tags associated with the photo. However, these interfaces do not display path information associated with the photos or route information between the photos.

However, at present there are no known user interfaces for displaying and/or interacting with a map including a continuous path and multimedia associated with points along the path.

BASIC CONCEPTS AND DEFINITIONS

Multimedia

Although "multimedia" has been variously used in other contexts to refer to data, to a sensory experience, or to the technology used to render the experience from the data, as used herein it broadly refers to any data that can be rendered by a compatible machine into a form that can be experienced by one or more human senses, such as sight, hearing, or smell. Similarly, although "multimedia" has been used elsewhere specifically in connection with the presentation of multiple sensory experiences from multiple data sources, as used herein it is intended to be equally applicable to data representative of but a single sensory experience. Common examples of such multimedia include data originally captured by physical sensors, such as visible or IR images recorded by photographic film or a CCD array, or sounds recorded by a microphone, or a printed publication that has been microfilmed or digitized. Other currently contemplated examples include data that is completely synthesized by a computer, as for example a simulated flight in space, digital text (in ASCII or UNICODE format) that can be rendered either as a page of text or as computer generated speech, or data representative of certain physical properties (such as color, size, shape, location, spatial orientation, velocity, weight, surface texture, density, elasticity, temperature, humidity, or chemical composition) of a real or imaginary object or environment that could be used to synthesize a replica of that object or environment. Multimedia data is typically stored in one or more "multimedia files", each such file typically being in a defined digital format.

Location

Location may be defined in terms of coordinates, typically representative of the user's position on the Earth's surface. Many coordinate systems are commonly used in celestial mechanics and there are known transformations between the different coordinate systems. Most coordinate systems of practical interest will be Earth centered, Earth-fixed (ECEF) coordinate systems. In ECEF coordinate systems the origin will be the center of the Earth, and the coordinate system is fixed to the Earth. It is common to model the Earth's shape as an ellipsoid of revolution, in particular an oblate spheroid, with the Earth being larger at the equator than at the poles. The World Geodetic System 1984 (WGS84) is an example of such a coordinate system commonly used in GPS applications. Within the WGS84 system, latitude and longitude will define any location on the Earth's surface. Any other generalized coordinate system, instead of latitude and longitude, defined on the ellipsoid, could be used to reference locations on the Earth. For some applications, a third coordinate, altitude will also be required. In GPS applications, altitude typically measures the distance not above the actual terrain, but above (or below) the aforementioned oblate spheroid representation of the Earth. In other applications, location could be represented in a one-dimensional coordinate system, corresponding for example to mileposts or stations (or even scheduled time) along a predetermined route.

Time

Similar to location, there are many methods for representing time. In many data processing applications, time is defined as the numerical representation of the time difference between the current time and an absolute reference time using some time scale. Local time may be calculated from this numerical representation by using additional latitude and longitude information.

Coordinated Universal Time (UTC) is a modern time scale that serves as an example of the time scale used in these inventions. The UTC time scale defines a very steady second and it is also tied to the earth's rotation. The second is defined in terms of the duration of a given number of periods of the radiation produced by the atomic transitions between two hyperfine levels of the ground state of cesium-133. In addition, the UTC system is synchronized to drifts in speed of the Earth's rotation by the addition of leap seconds.

Path

As used herein, "path" means an ordered sequence of adjacent locations (from GPS or otherwise; it may include latitude, longitude and/or altitude) each having an associated sequential time stamp (typically from GPS, from other wireless services, and/or from an internal clock or counter). Equivalently, a "path" may be thought of as a sequence of time data, each associated with a respective location from a sequence of locations.

"Path-Enhanced" Multimedia (PEM)

The association of path information (e.g., time and location data) and multimedia generates "path-enhanced" multimedia. Path information is recorded for the path traveled between and during the recording of the individual recorded multimedia files. In other words, the path information includes path times and locations at which multimedia was and was not recorded. Note that one multimedia file associated with a given point on a path can correspond to more than a single instant of time, and that more than one multimedia file can be associated with the same point.

SUMMARY OF THE INVENTION

Systems and Methods of viewing, modifying, and interacting with "path-enhanced" multimedia (PEM) are described. Systems and Methods are based on providing different types of views of all or a portion of the PEM data that determine the manner in which all or a portion of the PEM data is displayed. According to the system, PEM data is stored according to a data structure including a first data object corresponding to "path-enhanced" multimedia (PEM) data which includes multimedia data and its corresponding path information, and at least one second object that stores information corresponding to a view which defines the manner in which the PEM data is to be displayed by the system. A user control receives a user input for selecting a view and provides the view selection to a renderer. In response, the renderer receives first and second data object types dependent on the user input view selection and generates display data which causes PEM data to be displayed according to the selected view. In other embodiments, the system and method provide user control to allow the modification and interaction with the PEM

BRIEF DESCRIPTION OF THE DRAWINGS

FIG. 2 illustrates a second example of an embodiment of the present invention in which PEM data is displayed according to a second calendar-based view;

FIG. 5A illustrates a view of "path enhanced" multimedia data including "field-of-view" data shown symbolically on the view.

FIG. 6 is a flowchart of an exemplary procedure for retrieving and rendering "geo-referenced" information satisfying a distance criterion;

FIG. 7 is a flowchart of an exemplary procedure for query formation and for selecting retrieved information satisfying a distance criterion; and FIG. 8 is a flowchart of an exemplary procedure for query formation and for selecting retrieved information satisfying both time and distance criteria.

DETAILED DESCRIPTION OF EXEMPLARY EMBODIMENTS

In general, the present invention relates to systems and methods of viewing, modifying, and interacting with recorded "path-enhanced" multimedia (herein referred to as PEM).

Figure 1:
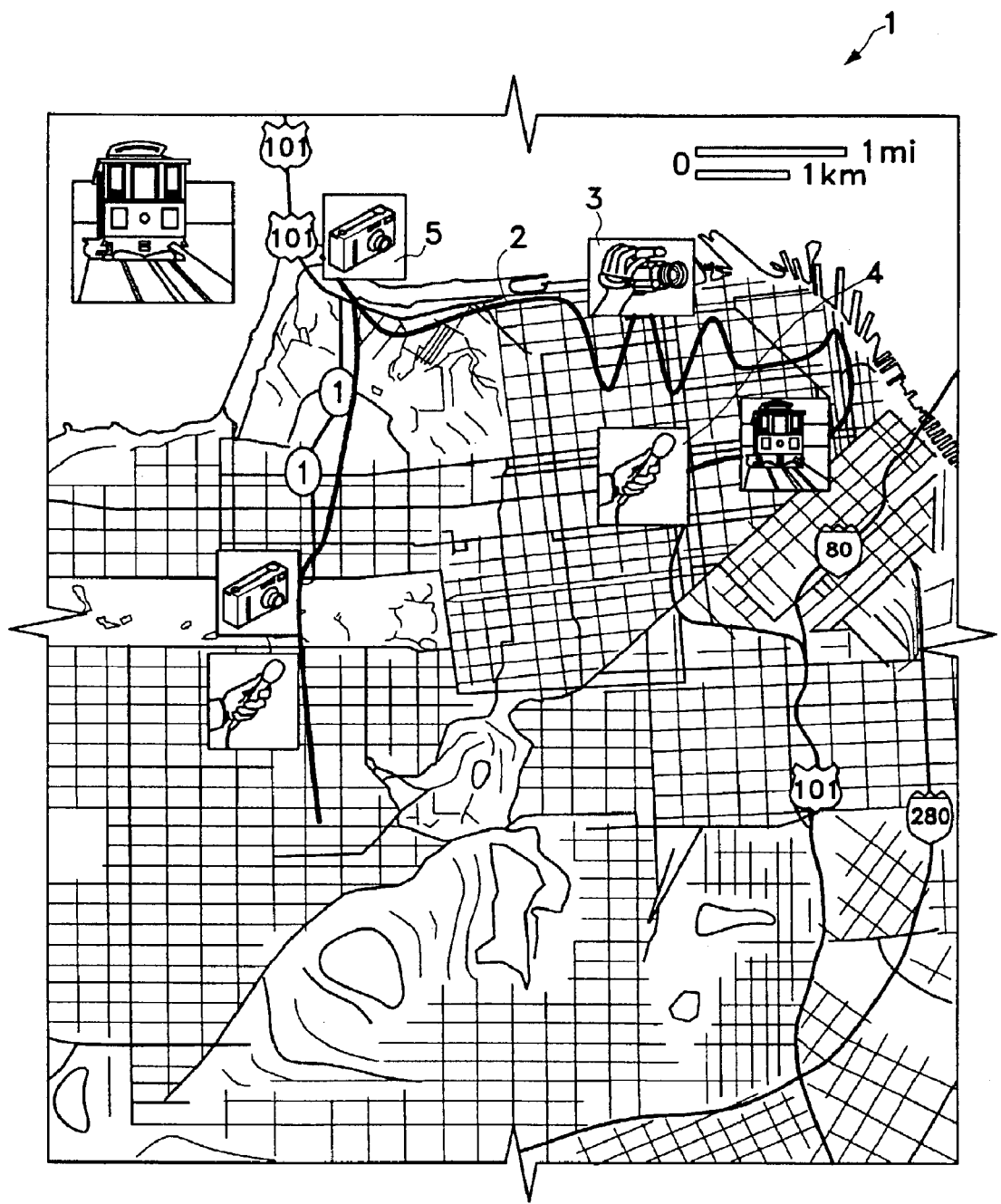
FIG. 1 illustrates a first example of an embodiment of the present invention in which "path-enhanced" multimedia (PEM) data is displayed according to a first map-based view.

FIG. 1 shows an example of PEM data displayed according to a first selected view. For purposes of the present disclosure, the "view" describes abstractly how a collection of PEM data is to be presented on a display device to a user. The view determines the organization of the PEM data presentation. A view can organize the presentation of the PEM data in several ways, including by geography (e.g., a "mapped-based view"), by time (e.g., a "calendar-based view"), by media type (e.g., a "media-list view"), and by combinations thereof. Each "type" of view organization may be further qualified by "style" parameters that control specific presentation appearance options (as will be described herein below). For example, in map-based views, style parameters include the choice of background map (e.g., a road map from a navigational database, or an aerial photograph), the smoothness and thickness of the paths to be rendered, and the style of icons to use for representing multimedia capture locations. A view also enables a subset of the collection of PEM data to be excluded from the display. For instance, a view might restrict display to only some subsections of the full path, and/or to some subset of the multimedia). The view might also restrict display to only the portion of the PEM falling within one or more spatial and/or temporal windows. Note that, at any given moment, the full view of the PEM data may not be visible on the display, so that the user must scroll and/or zoom the display to see other parts of the PEM data. In other words, the abstract "view" is distinct from the physical view output by the display device to the eyes of the user(s).

In the example shown in FIG. 1, the view produces a map-based presentation that includes iconic representations (3, 4, 5) corresponding to multimedia recorded during a vacationer's trip, overlaid upon a map of San Francisco (Map 1). In particular, the vacationer has followed a path (overlaid Path 2) and used a multimedia recorder to capture various multimedia files (overlaid icons: Video 3, Sound 4, Photo 5) along that path 2, together with the associated path information itself, as explained in more detail in the referenced co-pending application entitled "Apparatus and Method for Recording "Path-Enhanced" Multimedia". This geographically-based view of the PEM data displayed by a user interface allows for a variety of user interactions (as will be described herein), such as playing back recorded multimedia by clicking on the corresponding overlaid icons, exploring the map by panning and zooming, annotating the trip using audio commentary or text captions, augmenting the trip display using third-party information and additional media, and editing and modifying the path and multimedia data. Such user interactions may serve many different purposes, including re-experiencing a past trip, planning an upcoming trip, sharing comments on a friend's trip, or editing trip data prior to its input into a system for automatic generation of a movie-like presentation, for example, as described in the above referenced co-pending patent application entitled "Automatic Generation of Presentations from "Path-Enhanced" Multimedia".

In one embodiment, third-party services may also be used to provide different types of specialty maps on which to overlay the displayed trip path and any related multimedia icons. In one embodiment, the choice of underlying maps can be dynamically selected and explored by the viewer. For a tourist who has visited San Francisco, for example, some maps on which he might want to lay out his trip data could include a satellite map of San Francisco, a tourist map showing the neighborhood names and boundaries, a historical map of the region, or a combination of digital elevation map and street map of San Francisco, possibly using available GIS technology (see http://www.usgs.gov/research/gis/title.html).

FIG. 2 shows a second example of PEM data displayed according to a second selected view in accordance with the present invention. In this view, the PEM is presented according to temporal relationships, thereby offering another way of reliving one's experiences. This view may be useful if the trip included many passes through the same small geographic area. As shown in FIG. 2, information about the trip is viewed in a calendar-based format 1A where each day 6 is a separate column, and each media file (3,4,5) has an associated time 7. Each entry in the calendar can list one of a plurality of types of multimedia (e.g., still images, video images, audio, etc.) and can show the duration of each listed multimedia. Names of places in the calendar entries can be automatically extracted from path data by using a database that associates geographic coordinates with place names, as described in co-pending application Ser. No. 10/426,775 entitled "System and Method for Creation of Video Annotations" assigned to the assignee of the present application and incorporated herein by reference. In one embodiment, the user preferably can dynamically select (e.g., through a user interface) the media types, times, keywords, or other options to be displayed on the calendar. This type of view might be used to perform temporal oriented inquiries/searches of the PEM including "Show me all audio commentary taken on Wednesday", and "Show me commentary made after the trip", or "Show me pictures from all the times I visited Union Square". Note that one media file associated with a given point on a path (i.e., a specified point in time) can correspond to more than a single instant of time (for example the 6 minute audio commentary 4), and that more than one media file (8, 9) can be associated with the same point.

Types of views other than geographical or temporally organized views are contemplated. For instance, the PEM data may be organized by type of multimedia content, for example in a table with one column for audio recordings, one for still photos, and so on, with the entries in each column organized by their associated time and/or location.

According to the present invention, views may display all or a portion of the PEM data. For instance, the displayed multimedia icons can be limited to those falling within a particular time period or within a particular geographic area, or to multimedia files having particular associated attributes such as "favorite" or "unedited" or "private".

The PEM presented in the views may subsequently be supplemented with additional data including for example annotation data, multimedia data, and auxiliary data (e.g., temperature, elevation, etc.) There are a variety of techniques for supplementing the PEM data.

Supplemental annotation data may include text labels for the trip or for individual photos that one took, or audio recordings of remembrances of the thoughts one was having while capturing particular photos and videos. These annotations can be integrated within data structures that store the original PEM data in such a way as to allow for seamless browsing, editing, and display of the annotated PEM data. In accordance with this embodiment, the annotation data integrated within the PEM data structures are preferably tagged, as will be described herein below, with indicators that clearly distinguish the subsequent annotations from the original PEM data. These indicators are useful for subsequent editing and searching.

Supplemental multimedia data can be added to views of PEM data by the user through manual file selection, e.g., manually locating a file in a database via a file system browser interface or similar user interface, and selecting the file. Alternatively, the time and location information of the path within the PEM can facilitate a search for supplemental multimedia that is relevant to the PEM. The supplemental multimedia can be stock multimedia (i.e., pre-existing readily available multimedia often available through an internet or extranet connection) obtained from third-party services, and might include multimedia such as a concert or speech performed at a nearby venue, or professionally made photos or videos of places visited but at which recording was not allowed, or other "geo-referenced" (i.e., including, encoded with, or associated with geographically-based information) multimedia data of potential interest to the viewer. If the weather or lighting was poor during portions of the original trip, professional stock photos and videos that were taken during better weather, different seasons, or different times of day could be substituted for the original photos and videos using these techniques. In one embodiment, when supplemental multimedia is added to the original PEM data structure, it is seamlessly integrated by tagging it in such a way as to identify it as supplemental. In addition, the supplemental multimedia is tagged with time and location data in a similar manner as the PEM's originally recorded multimedia. Specifically, inserted multimedia files are preferably tagged with data fields that detail 1) the actual time and location of their creation (or an indication that the actual time and/or location is not available), as well as 2) virtual times and locations that determine their temporal and geographical relationships with respect to the original path and multimedia data displayed for the trip.

Views of the PEM can also be supplemented by non-multimedia, auxiliary data obtainable from various other types of geographically-based databases and services. For example, a display of a trip may be supplemented with text labels (or synthesized voice) detailing temperature, elevation, or historical data at various points (i.e., path times and locations) along the trip path displayed within the view. Similarly, icons representing local news headline events occurring at more or less the same time and place as the data capture may be added to the displayed view of the PEM, so that the news stories accompanying these headlines are displayed or spoken (via synthesized speech) when the icon is selected.

The view of the PEM can also be dynamically supplemented/updated to include current information and content, so that interaction and viewing of the displayed view of the PEM reveals new information relevant to one's previous travels (i.e., previously recorded PEM). For example, a vacation recorded three years ago can be automatically enriched with current stock multimedia information and non-multimedia information (preferably but not necessarily indexed by location) from third party databases. According to this embodiment, an interface allowing interaction with this type of view would allow inquiries/searches such as: "What does the place I visited look like now?", "How has it grown?", "Is the hotel I stayed at still in business?", and "What are its current rates?". In one embodiment, a link to an Internet-enabled source (such as a live webcam) of real-time multimedia originating from a location near the displayed path can be included.

In another embodiment, a virtual path may be defined within the view which corresponds to an imaginary trip or contemplated future vacation, possibly using only supplemental stock sounds and images. The supplemental multimedia can be organized with a geographically-based (e.g., path-oriented) user interface that allows control over the sequence and geographic location of the supplemental multimedia content along that virtual path. This virtual path interface can be particularly useful for planning prospective trips when the virtual path and map are linked to dynamically updated, current, geographically-based data and multimedia content, as described above.

The PEM data can include security attributes for limiting access to all or identified segments of the PEM's path information and to portions of the PEM's multimedia data, so as to facilitate control of data access when data is shared by means of e-mail, CD-rom, the Internet, and other similar distribution mechanisms.

It should be understood that the disclosed PEM technology is also applicable to consumer and business applications other than the sharing of vacation memories. For example, it may be useful for people involved in scientific exploration missions, such as for geological or biological scouting expeditions, where explorers would like to create a rich, multimedia record of what they found, and would like to simplify the process of compiling their documentation into a format that can be easily reviewed or shared with others. It may also be a valuable tool for news reporting teams gathering material for a story, for law enforcement officials or private investigators documenting evidence in the field, for members of the military while on reconnaissance missions, for surveyors and construction workers analyzing a building site, and for real-estate agents attempting to build multimedia, map-based presentations of homes for sale.

Figure 3:
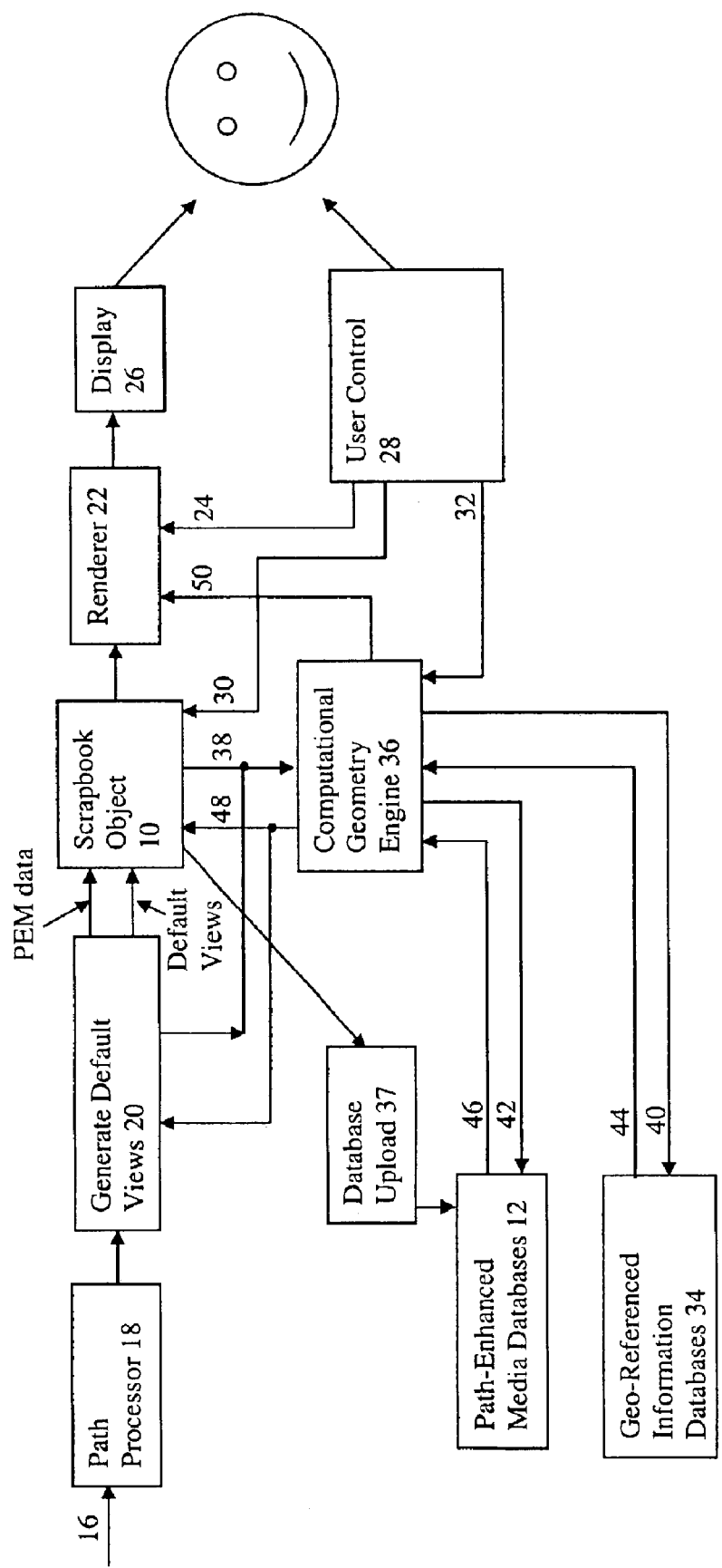
FIG. 3 is a block diagram of an exemplary system for viewing, modifying, and interacting with PEM data.

An exemplary system for viewing and interacting with the PEM data according to the above-described functionality is shown in FIG. 3. In particular, the system shown in FIG. 3 facilitates the rendering of the PEM data on a display according to the views as described above. According to one embodiment, the system includes the Scrapbook Object 10, the Generate Default View 20, the Renderer 22, the Display 26, and the User Control 28. The system optionally includes Path Processor 18, PEM Databases 12, Geo-Referenced Information Database 34, Computational Geometry Engine 36, Database Upload 37.

In general, the system provides for the creation of Scrapbook Objects 10 and implements methods for displaying, browsing, editing, and augmenting the PEM information. According to this embodiment, PEM data and default view data is received from the Generate Default View block 20 and are stored by the Scrapbook Object 10 into a data structure as will be described herein below. In the preferred embodiment, block 20 generates default views having types of "map", "calendar", and "media type". For example, a default map-based view is generated by the following steps:

1) Time and location information 38 is sent from the Scrapbook Object 10 to the Computational Geometry Engine 36, which computes the spatial bounding box of the PEM data;
2) A Query 40 based on this bounding box is sent by Computational Geometry Engine 36 to a Database 34 containing maps organized by location;
3) Map information is returned in a Query Response 44 to the Computational Geometry Engine 36;
4) The Computational Geometry Engine 36 filters this query response to contain map information of a size large enough to cover the spatial bounding box of the PEM data, but not so large that the PEM data occupies only a small fraction of the map;
5) The filtered map information is sent as a Filtered Query Response 48 back to the Scrapbook Object 10 for use in the default map-based view.

The default calendar-based view shows a range of dates and times encompassing all of the times associated with data in the PEM, and has entries with place names retrieved from a Database 34 associating location coordinates with names. The place names are retrieved from a database in a manner analogous to that described above for map information, except that different queries may be used to retrieve names for different bounding box regions, and databases of place names rather than map information are used so that place names are returned in the queries.

A default view organized by media type is also generated, containing one section for each type of multimedia associated with the PEM. As for the default calendar-based view, place names can be associated with the different multimedia entries in this view, through queries of databases associating place names to geographical coordinates. The Time and Location Data 38 associated with the multimedia and/or the path near them are used by the Computational Geometry Engine 36 to generate these Queries 40.

For each type of default view, a default set of style parameters is used to specify layout and representation preferences for that view. Also, for all of the default views, all of the path, multimedia, and other data in the PEM, except that designated as "hidden", "private", or similarly protected prior to input of the PEM data into the system, is designated for inclusion in the view, so that representations of all of the PEM data will be generated by Renderer 22 if possible.

The data structure facilitates the display of the PEM data according to the different view types. In addition it facilitates the searching, and modifying of the PEM data. A user selects a type of view using User Control 28, causing a Select View signal 24 to be provided to Renderer 22. Dependent on signal 24, PEM and View data are transferred to Renderer 22. Renderer 22, then generates data for driving Display 26. Display 26 displays the PEM data via a graphical user interface (GUI) according to the selected view. In one embodiment, Select View 24 allows for selection among possible types of views including but not limited to a map-based view, a calendar-based view, or a table-based view (how many videos, length of videos, etc.). The Select View 24 can also provide user control to select what data is displayed within the view. For instance, only multimedia within a bounded time and/or space, or that correspond to some specially named or labeled subset of the PEM data, such as "Favorites" may be displayed according to the selected view.

It should be noted that the originally recorded PEM data provided to the system shown in FIG. 3 can be provided from a PEM recorder device described in co-pending application Ser. No. 10/427,614 or any other source such as a storage device (e.g., CD disc). However, the PEM data may also be produced by other device sources or combinations of recording devices, or may be generated completely or in part by artificial means (e.g. by manually drawing a path on a map using a computer mouse or by typing path information via a computer keyboard, together with manual selection of multimedia files to be associated with points along this path). In general, PEM data may be thought of as two types of data including: 1) essentially continuously sampled and recorded path time and location data (i.e., path information), and 2) recorded multimedia data. These two types of data are associated with each other by means of pointers built into an overall data structure, as described herein.

In one embodiment, the path time data portion of the PEM data can include both the calendar date and the time in some known time reference system such as Coordinated Universal Time (UTC). The path location data portion of the PEM data can include a two-dimensional coordinate in some coordinate system spanning the surface of the Earth (such as a standard latitude and longitude coordinate system), but may also include elevation relative to sea level, orientation information for the recording device, and other types of continuously sampled sensor data. When photo or video media are being recorded, the path location and orientation data may describe not just where the multimedia was captured, but also the region of space viewed by the recorder at capture time. This region can be determined approximately by the field-of-view (FOV) of the recorder, computed from the recorder's focal length and the imager size, in combination with the device position and orientation, the latter of which is preferably determined from a compass and an inclinometer embedded in the recording device, as discussed in greater detail in the referenced co-pending application entitled "Apparatus and Method for Recording "Path-Enhanced" Multimedia".

In one embodiment, the Path Processor 18 processes and refines the path information within the received PEM data prior to providing it to the Scrapbook Object 10. For example, it can smooth the path to remove spatial jitter (e.g. due to multipath signal interference at the GPS receiver), interpolate paths within regions where measured location data is not available, simplify the path to remove small loops or meanderings (perhaps where a person back-tracked briefly or otherwise dawdled), and/or separate the path into non-overlapping portions for improved map-overlay presentations. The Path Processor 18 may also compute trip statistics that are presented for display to the user, such as text notes on a "Trip Summary" window that might state facts such as "Traveled 6 miles in 4 hours" or "Average speed=2 miles per hour".

The Path Processor 18 may also function to analyze path information within the PEM data to identify events that occurred along the path during the recording of the PEM data. For instance, Path Processor 18 may detect "stop points" and/or "indoor sites" along the traveled path, for example through analysis of "signal strength" or through calculations based on velocities derived from location and time differentials. The detected "stop points" and "indoor locations" may be tagged within the Scrapbook Object 10 data structure and may be used to automatically generate optional layers of presentation of the PEM. For example, after the PEM data is transferred from the recording device to the system, Path Processor 18 may find "stops" as places where the travel velocity was near zero for a predetermined amount of time. When the PEM data is displayed, as described below, special icons may be inserted to indicate where these stops occurred. Additionally, the locations of these stops may subsequently be used to construct criteria for searching for information within the PEM data to enhance the displayed trip. For example, the user may want to find stock photos from third-party databases near any location at which he appeared to stop for a specified period of time.

Scrapbook Object 10 Data Structures

Figure 4B:
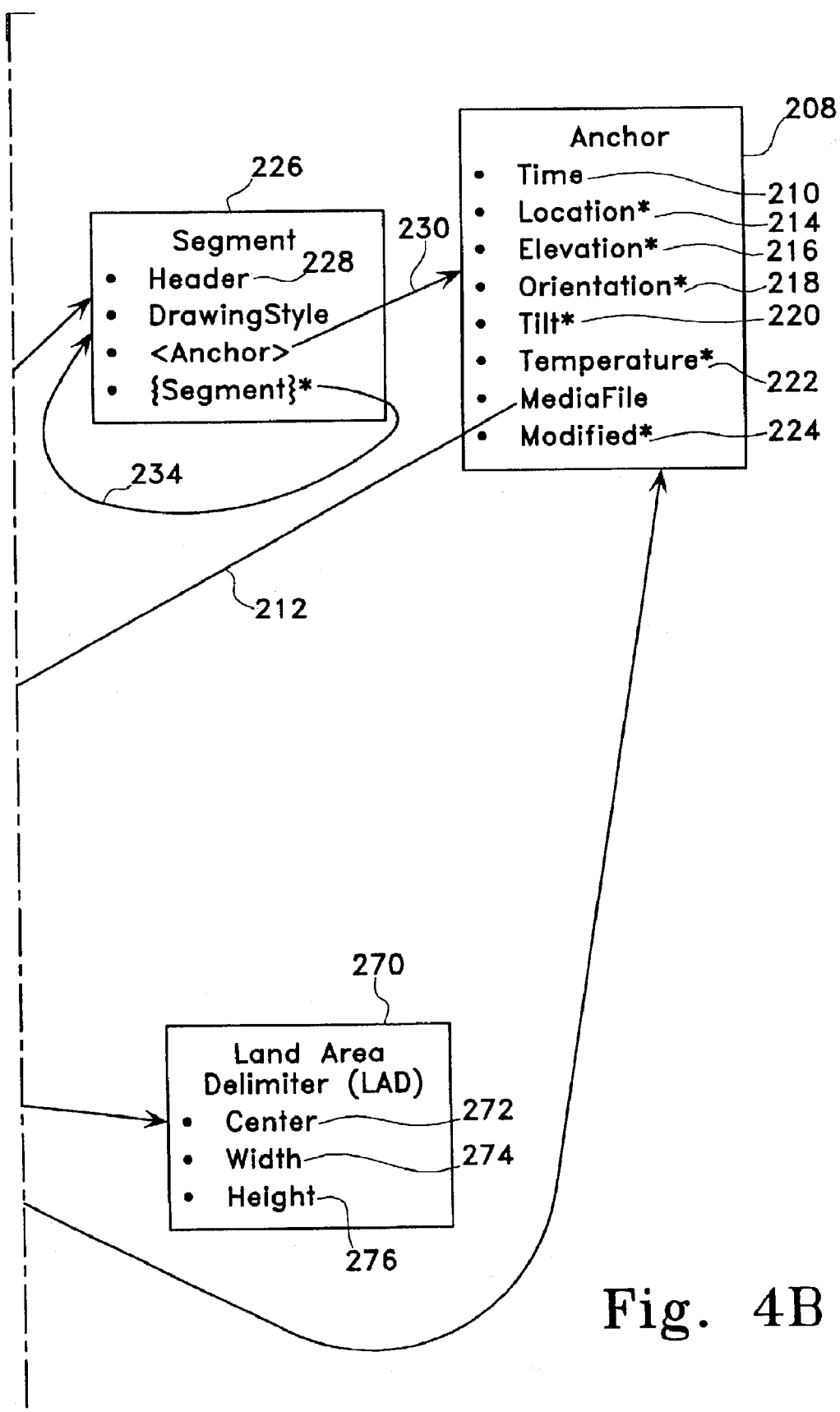
FIG. 4 shows portions of an exemplary scrapbook object data structure layout.

The Scrapbook Object 10 is implemented as data structures as shown in FIGS. 4A and 4B, and are described in more detail below and in the referenced co-pending application entitled "Indexed Database Structures and Methods for Searching Path-Enhanced Multimedia". Note that FIGS. 4A and 4B set forth only a portion of the data structure from the referenced application. It should be further noted that in accordance with the conventions set forth therein, an arrow indicates a pointer to an embedded data structure, paired angle brackets indicate a possible list of data structures of the indicated type, paired curly brackets indicate a recursive data structure, and an asterisk indicates an optional field.

The Scrapbook Object 10 data structures include two primary components or data objects: 1) a Path-Enhanced Multimedia (PEM) data file 200 and 2) one or more views 202, with each view 202 both describing a Style 204 in which to render the PEM data in a display and also specifying the portions of the path and/or multimedia data in the PEM 200 that should be included in that particular rendering. Each PEM 200 includes (indirectly, through its Segment list 232) two basic components: recorded GeoTemporalAnchors 208 (sometimes abbreviated herein as Anchor) and associated MediaFiles 206. Each GeoTemporalAnchor 208 can include not only a Time 210 (i.e., path time data), but also an optional Location 214 (i.e., path location data) if a reliable measurement has been obtained at the associated Time 210. Each GeoTemporalAnchor 208 may also contain fields storing various types of auxiliary sensor data such as Elevation 216, Orientation 218, Tilt 220, and Temperature 222 that are sampled and recorded in an essentially continuous manner similar to Time 210 and Location 214 at the time of recording the PEM. Each GeoTemporalAnchor 208 may also contain a pointer 212 to a particular MediaFile 206, although in alternative embodiments the MediaFile and GeoTemporalAnchor could be combined into a single object (which might exclude use of conventional file formats for the MediaFile 206), or the association could be made by means of a separate link table. Each MediaFile 206 is typically a data file representing an audio stream (for example, in MP3 format), a still image (for example, in JPEG format), or a video stream (for example, in MPEG format). However, other types of multimedia are contemplated.

GeoTemporalAnchor 208 can include an optional Boolean flag, Modified 224. If set to "true", this flag indicates that the associated GeoTemporalAnchor is not the originally recorded PEM data, but rather was created or modified after the PEM recording. These modified GeoTemporalAnchors may be part of an entirely fictitious virtual path or path segment, a reconstructed path segment obtained by interpolating or smoothing other original PEM path data, or an edited original path or path segment that has been moved in time and/or location from what was originally recorded. The Modified flag is also preferably set to "true" when a Media-File 206 or other supplemental data is attached to or removed from an associated GeoTemporalAnchor 208, or if the supplemental data associated with a GeoTemporalAnchor 208 is in any way modified, during user editing of the "path-enhanced" multimedia data. Hence, if the PEM data for a given path point is supplemented with additional data, the path point is tagged by setting the Modified flag "true". Moreover, if any original data is modified the flag is set to "true".

A single path may be defined by the Segment 226 data structure, which contains an <Anchor> list of pointers 230 to GeoTemporalAnchors 208. The Header 228 within the Segment data structure 226 also allows drawing styles, access restrictions, and other attributes (e.g. "Favorite", "Tentative", etc.) to be associated with the path. However, it is contemplated that the user may desire to associate different attributes with different parts of a path, and that several discrete paths (possibly corresponding to different trips and/or different travelers) may be recorded by the same recording device or otherwise included in a common PEM data set for display, sharing, and editing. To that end, the Segment data structure 226 is regarded as capable of optionally representing only a portion of a complete path, or just one of several discrete paths in a combined data set. A sequence of several related Segments 226 (for example, portions of a single path recorded by a particular user) may be connected by a recursive {Segment} pointer 234 within the Segment data structure 226, thereby defining a sequence from one Segment to the next within a complete path. Also, different multiple such Segment sequences (possibly with different authors and/or recorded on different visits to the same place) may be included in a single PEM 200 by means of <Segment> list 232.

Since each GeoTemporalAnchor 208 may include a pointer 212 to any associated MediaFile 206, there is an indirect association between the PEM 200 and its Media-Files 206. However, by optionally including in the PEM data structure 200 an explicit list 236 of pointers to MediaFiles associated with GeoTemporalAnchors within the Segments 232 of the PEM, the complete set of multimedia files associated with a PEM will be more amenable to searches and/or modifications.

In one embodiment, the hierarchical data structure of the PEM 200, the Segments 226 and the MediaFiles 206 facilitates different levels of ownership and access to be associated with the different data elements. For example, different PEMs 200 may be created by different authors, or be owned by different users, or belong to different trips, as reflected in the Header 238 for each PEM 200. Similarly, each Segment 226 of the same PEM 200 could be part of the same trip but belong to a different user, as reflected in the respective Segment Header 228. Also, each MediaFile 206 in a particular PEM 200 could have a different creator as reflected in its associated MediaFile Header 240.

More than one view 202 may be associated with a given PEM 200 data structure. A particular view 202 can define not only a particular style of rendering the same PEM data (for example, a map-based, calendar-based, or media-type-based view), but can also restrict the rendering to one or more different temporal or spatial portions of a trip (for example, those within specified geographic boundaries or within one or more intervals in time), and can restrict display of media to some subset of that contained in the PEM (for example, those marked as "favorites"). Each view 202 contains some or all of the following elements:

Type 242: for example, "map", "calendar", or "media type".
Map 244: optional pointer to a Map 252 data on which to overlay the display of the PEM data.
Style 204: list of tuples associating tags with values, describing how to display the PEM data.
<TimeInterval> 246: list of what portions, according to their associated time stamps, of the PEM are to be displayed in this view.
<MediaFile> 248: list of pointers to MediaFiles that should be rendered in this view of the PEM.
MediaChk 250: rules for deciding whether to render a particular MediaFile 206 in this view, based on the Name and/or Format fields in MediaFile Header 238.
PermissionChk 252: rules for deciding whether or not to render a particular Segment 226 and any associated MediaFiles 206 based on the Permissions field in the Segment Header 228 and/or the associated MediaFile Headers 240.

For the optional elements TimeInterval, MediaFile, MediaChk, and PermissionChk, the default is ALL (i.e. render all items).

In a map-based view, the path and multimedia data is overlaid on a map image. The Map data structure 252 describes the map image to be drawn, and how to draw it. It may also be associated with MediaFiles and other information independently of any PEM context. The Map data structure 252 can include the following elements:

Image 254: either the map data itself, in image, vector, or other format, or just a pointer to a suitable MediaFile.
TransformType 256: procedure for warping the map image data in order to align it with the global coordinate system describing locations in a PEM path.
<TransformParam> 258: parameters to be used in the above warping.
LandAreaDelimiter (LAD) 260: restricts the displayed portion of the warped map to a selected region within the PEM coordinate system.
<GeoTemporalAnchor> 262: associates MediaFiles 206 or other optional information (such as Temperature) directly with the Map 252, and provides any required Time 210, Location 214, or other descriptive data.
TimeInterval 264 defines a StartTime 266 and an EndTime 268, so that the list 246 of these for a particular view 202 define the time windows of the portions of the PEM path that are to be displayed in the view. LandAreaDelimiter (LAD) 270 defines the bounds of some section of the globe, in a 2D coordinate system. In an embodiment that tessellates the globe into sections aligned with the latitudinal and longitudinal direction lines, the LAD might have the following structure:
Center 272: location of the center latitude and longitude of the rectangle.
Width 274: longitudinal extent.
Height 276: latitudinal extent.

When the view Type 242 is set to "Map", exemplary Style tags 204 include:
MapOrigin: The location of the upper-left corner of the map in some 2D world coordinate system.
MapScale: The scale of the map in the 2D world coordinate system.
IconStyle: How to render icons representing media. For example, an IconStyle tag with the value "thumbnail" might indicate that images and video should be represented with small images that are representative of the media content; the tag value "numeric" might indicate that media files are drawn as numbers in boxes, in the order of capture.
IconMapScaleParams: A set of map scale rules that, together with IconStyle, determine when to aggregate the icons that represent individual media into composite icons that represent a set of media.
DurationStyle: How to display the duration of individual, non-instantaneous multimedia such as video and audio. For example, a DurationStyle tag with the value "start/stop" might indicate that separate icons are attached to the path at points where a video recording begins and ends. The tag value "elapsed" might indicate that the associated icon includes a numeric indication of the length of the recording, while the tag value "segment" may indicate that the path segment during which the recording was being made is distinctively marked.

As discussed above, the view data structure 202 contains, for map-based views, a pointer to a suitable map on which to draw the path information and the icons representing the locations at which multimedia was captured. The raw map data is optionally accompanied by map bounds and/or geometric transformation information needed to crop and align the full map so that it overlays the displayed PEM data 200 in a visually pleasing and accurate way. Referring to FIG. 3, the Renderer 22 may draw the portion(s) of the PEM path specified by the Select View signal 24 in any of several styles specifiable by the Style parameters 204 in the view data structure 202. In one exemplary map style, the Renderer 22 simply draws lines connecting, in time-ordered fashion, the map locations corresponding to all GeoTemporalAnchors 208 to be displayed. Alternatively, if the Path Processor 18 has computed a representation of the path in terms of splines, curves, or other geometric elements, the Renderer 22 will draw these elements on the displayed view of the PEM data.

The Renderer 22 may indicate the map locations corresponding to the capture locations of multimedia files in any of several styles specifiable by the view Style parameters 204. In the exemplary map style shown in FIG. 1, an icon 5 indicating the type of the multimedia file (e.g. video, audio, or photo) is displayed on the map at the capture location associated with each multimedia file to be displayed in the view. Alternatively, multimedia capture locations may also be indicated with text annotations, numeric icons, thumbnail images (for visual media), or by other methods, depending on the view Style parameters 204.

Figure 5B:
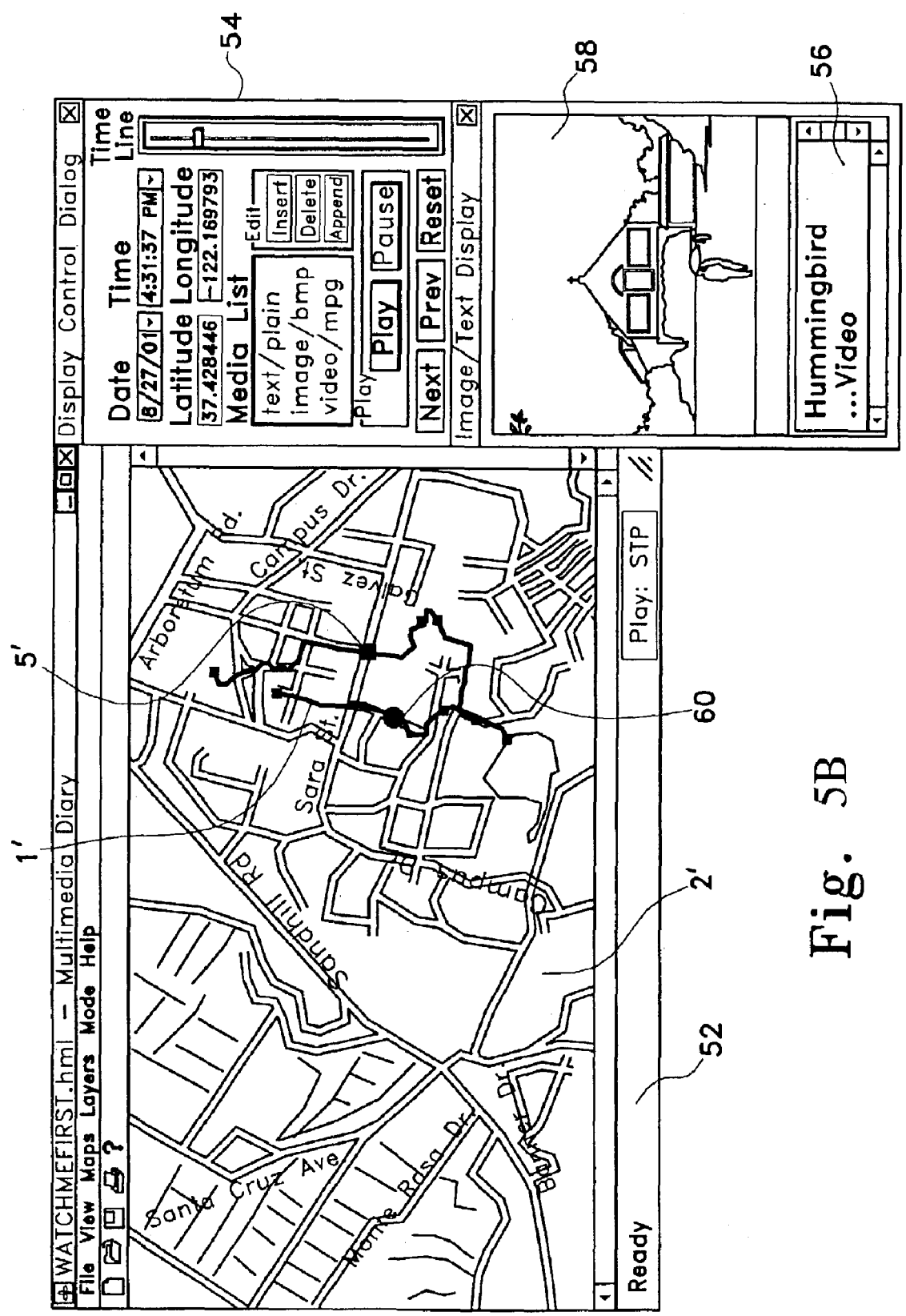
FIG. 5B depicts an embodiment of a user interface displaying an exemplary scrapbook object containing different types of "path-enhanced" multimedia.

For visual multimedia such as photos and videos, the region of space viewed by the camera at capture time (i.e. its "field-of-view") may also be rendered in any of a variety of ways specifiable by the view Style parameters 204. In one exemplary style, the spatial extent of the camera field-of-view in the plane of the map is indicated by a colored or shaded region emanating from the multimedia icon location. Alternatively, an arrow emanating from the multimedia icon location can be used to indicate the central axis of the camera field of view within the plane of the map as shown in FIG. 5A. As shown in FIG. 5A, field-of-view data is shown symbolically on map 1 by appending an arrow to multimedia icon 5, with the direction of the arrow indicating the compass heading of the camera, and the length of the arrow indicating its approximate focus. For example, a long arrow 52a can indicate a distant setting in which the camera was focused on a distant object, while a short arrow 52b could indicate a close-up setting in which the camera was focused on a nearby object. The tilt angle of the camera may optionally be indicated by the choice of color or shading of the depicted region or arrow. For example, more intense shading of the field-of-view arrow or region at greater distances from its anchor point at the icon could indicate an upward tilt of the camera, while lighter shading at greater distances from the icon could indicate a downward camera tilt. For a field-of-view represented by an arrow, another method of indicating the camera tilt angle relative to the ground is to increase the arrow's thickness, going from the camera location to the arrow tip, in proportion to how upwardly directed the camera was. For fields-of-view represented as 2D shapes, another method of representing the camera tilt angle is to draw the 2D shape as if it is tilted relative to the map, with a shadow rendered so as to indicate the direction of its tilt. For video media, the field-of-view may be represented as the union of all the field-of-view renderings for multiple individual frames of the video, or some approximation or bounding hull thereof. In yet another possible view Style 204, the field-of-view and other relevant information could be represented by simple textual annotations. Other methods for indicating the field of view are described and illustrated in the referenced copending application entitled "Apparatus and Method for Recording "Path-Enhanced" Multimedia".

One example of a user interface for viewing, modifying, and interacting with a Scrapbook Object is shown in FIG. 5. It consists of four windows. The first window 52 contains a path 1' and multimedia icons 5' overlaid on a map 2'. Within this first window, the user may 1) explore the rendered PEM data by scrolling or zooming the window; 2) select icons (for example, through double-clicking with a computer mouse) of multimedia that he wishes to play; 3) edit the path information in a graphical manner; 4) generate geo-temporal queries for relevant data from "geo-referenced" databases; and 5) perform a number of other map-based interactions. If the displayed icons include an indication of the camera's field of view, as described above, the editor will be able to verify whether any deletions or changes in the sequence of the individual multimedia files will result in sudden and potentially annoying changes in camera orientation or focus. A second window 54 provides tools for playing a movie-like "presentation" generated from this Scrapbook Object 10, as detailed in the referenced co-pending patent application entitled "Automatic Generation of Presentations from "Path-Enhanced" Multimedia". The third window 56 shows a list of currently selected multimedia and can be used to edit multimedia attributes. The fourth window 58 is a multimedia player.

Referring back to FIG. 3, the User Control 28 functions to receive user inputs for facilitating the viewing, modifying, and interacting with the PEM data as well as the displayed view of the PEM data. User inputs may be received by User Control 28 via user interfaces such as a keyboard, a mouse, a touch sensitive display screen, or the like. In one embodiment, User Control 28 provides a signal, Select View 24, generated from a user input, for the selection of a view 202 of a PEM 200 to be rendered. User Control 28, allows the user to customize the view of the PEM data to show only a portion of the multimedia and/or path data displayed by the view according to time, location, or multimedia category information. In addition, in the case of a map-based view of the PEM data, Control 28 enables a user to spatially zoom or scroll through the map. In general, this interface provided through User Control 28 facilitates user interactions with the displayed view including selecting icons to initiate the playing of multimedia, controlling the playback of the selected multimedia (such as fast-forward, pause, and rewind of audio and video media), and performing multimedia editing functions (such as cropping or color adjustment of photos).

In addition, User Control 28 allows for various methods of modification of the Scrapbook Object 10. For example, referring to FIG. 3, dependent on the user's input through User Control 28, a Edit 30 signal is generated and provided to the Scrapbook Object 10. The Edit 30 signal can cause the Permission attributes for Headers 228,240 in Segments 226 and MediaFiles 206 to be edited, thereby allowing the user to select which multimedia and path segments in his published (saved) Scrapbook Object 10 are viewable, editable, etc. by one or more sets of other users. The Edit 30 signal can also be used to manually edit the Time 210, Location 214, author, or other information associated with a Media-File 206, its Header 240, or its associated GeoTemporalAnchor. User Control 28 is further used to add supplemental information such as adding new manual annotations to the Scrapbook Object 10 (e.g., text labels or audio narrations to be associated with photos) as well as to edit other attributes. User control 28 can be used to "bookmark" the data to categorize multimedia and/or path sections so as to be able to interact with and view specific groupings of the tagged multimedia and/or path sections.

The User Control 28 can be used to edit the Scrapbook Object 10 to add supplemental information (e.g., security classes) to implement privacy protection, in that they allow the user to specify which portions of a "path-enhanced" multimedia data object are viewable by various users when the data object is shared. These privacy and security controls may interact with or be used by the security mechanisms employed by the various methods for sharing "path-enhanced" multimedia (e.g. database servers, peer-to-peer, and simple e-mail to friends).

User Control 28 additionally allows the user to modify the path data in the Scrapbook Object's PEM 200 via a graphical interface similar to those shown in FIG. 1 and FIG. 5. For instance, the user can revise a portion of the path 2, request automatic smoothing or loop removal for some portion of the path, draw entirely new segments of path, or remove sections of the path. Such modifications of the recorded path may be desirable for a number of reasons. For example, in many situations, such as when a person "doubles-back" or when a person completes multiple loops through the same geographical area, the precise path taken by the person and recorded automatically by GPS or other means may result in the building of a map-based view of the data that is organized less clearly than in the person's mind. The person might wish to simplify the displayed path, so that it still passes by most or all of the sites at which multimedia were recorded and so that it roughly represents the true activities of the user, but so that it omits various distracting or unimportant details, such as side trips to find food or bathrooms. The person may even want to use an entirely new path that shows how he might conduct a tour of the area visited if he were to go back, when in reality he visited the individual locations in the area in a completely different and more haphazard order.

During graphical editing of the path, according to one embodiment, if the user selects portions of the path to be deleted, gaps may be opened up within the path. The endpoints of a gap can be automatically reconnected with a straight line or via other interpolation methods (e.g. cubic splines), or the user can choose to draw on the map a new path portion that bridges the gap. When portions of the path have been removed, the MediaFiles 206 associated with the removed portions may, at the request of the user, 1) be removed from display, 2) automatically attached to the nearest remaining GeoTemporalAnchors 208, or 3) presented to the user for manual reassignment to other GeoTemporalAnchors 208. The user may also draw new path portions that add to the beginning or end of the current path, or he can choose to delete the entire path and draw a new one. When a new path portion is drawn, the user may be prompted to input Times 210 to be associated with as many of the new GeoTemporalAnchors 208 as desired. Inconsistent time inputs, such as a set of times along a path that do not increase monotonically, are rejected by the system, and the user is asked to correct them. Linear interpolation may be used to automatically calculate Times 210 between Locations 214 where time is available either from user input or from the recording of the original adjacent path Segments 226. The user may also edit the time information for path Segments 226 whose shape is not modified, by selecting points along the path and entering new times for them. The recording initiation times for various multimedia can be automatically modified to be consistent with any changes to the time information for the path segments on which they lie. MediaFiles 206 may be added to modified or newly created path segments by any of the methods described herein. GeoTemporalAnchors 208 that have been modified or created at the user's request, as opposed to being directly recorded from sensor information, can be flagged as such by means of the Modified flag 224. Any of the full range of computer input and output devices, including standard keyboard and mouse interfaces, and tablet PCs, may be used to support these path-editing tasks.

User Control 28 also allows for the insertion of new media files into the Scrapbook Object 10. When a map-based view is being displayed, one technique for adding supplemental media proceeds as follows. The user selects a point on the map using the mouse or some other input device, and the system identifies and highlights the closest location to this on the displayed path. If the closest path location currently has no GeoTemporalAnchor associated with it (e.g. because it is along a line connecting two widely spaced GeoTemporalAnchors), a new GeoTemporalAnchor is created. If a GeoTemporalAnchor already exists, but already has a MediaFile associated with it, a new GeoTemporalAnchor is created with the same time and location data but no associated MediaFile. In either of these cases, the Modified flag of the GeoTemporalAnchor is set to "true", to indicate that this path location is not original PEM data. Otherwise, an existing GeoTemporalAnchor will be modified. A dialog box is opened that allows the user to then select a MediaFile (presumably from a digital computer storage device or similar source) to be associated with this GeoTemporalAnchor. The dialog box also provides the user with simple methods for creating a new MediaFile for insertion. For instance, it allows the user to record a new audio comment, or to type a text comment. The dialog box also asks the user if the new MediaFile should be inserted into just the currently rendered view, or into some or all of the other views of the Scrapbook Object 10 as well. The selected or created MediaFile is assigned a derived "virtual" location and time, which is stored in the Location and Time fields in the associated GeoTemporalAnchor, that allow it to be seamlessly integrated with the rest of the Scrapbook Object 10. The Header field of the inserted MediaFile may retain the multimedia's original capture time and location (for instance, to allow for subsequent filtering or processing), but the derived virtual Time and Location in its associated GeoTemporalAnchor allow it to be displayed and otherwise related as desired in the context of the other PEM data in the Scrapbook Object 10.

The User Control 28 can also include an interface that leverages the context of the PEM data rendered on Display 26 to help the User 14 generate appropriate queries for information from supplemental location- and/or time-organized databases. Referring to FIG. 3, the process of searching databases in the context of the displayed PEM data may be summarized as follows. User Control 28 provides the user with an interface for creating Queries 32 based, for example, on spatial and/or temporal proximity to the PEM displayed by Display 26. These queries may also be based on other criteria involving spatial, temporal, or other attributes relevant to PEM (such as author or owner, multimedia category, and so on). The search may be for new multimedia material, or for other information such as overlay maps, regional music, weather data, or other information relevant to the displayed PEM. Computational Geometry Engine 36 translates these Queries 32 into a form, herein denoted as Filtered Queries 40, 42, that are compatible with the databases of interest. The databases may be in either of two categories, herein denoted as Path-Enhanced MultiMedia Databases 12 and Geo-referenced Information Databases 34, which are further described below. The Query Responses 44, 46 returned by the databases may then be refined by the Computational Geometry Engine 36 to be consistent with the criteria specified by the user. These Filtered Query Responses 50 are forwarded to the Renderer 22 for display with the Scrapbook Object 10 on the Display 26. User Control 28 may be used to browse and review the query responses (via user interface provided by User Control 28), and to optionally select some or all of these responses for integration into the displayed "path-enhanced" multimedia data structure.

Two categories of supplemental databases, herein denoted as Path-Enhanced MultiMedia Databases 12 and Geo-referenced Information Databases 34, are contemplated by the invention. Path-Enhanced MultiMedia Databases 12 contain multimedia collected by one or more users over arbitrary lengths of time, and form the underlying structure supporting the various methods of PEM sharing, searching, and organizing discussed in the referenced co-pending application "Indexed Database Structures and Methods for Searching Path-Enhanced Multimedia". For example, a person might store all of their PEM in one such database, so that he could request access to his multimedia via a map-based interface to the database. One or more users can contribute their "path-enhanced" multimedia to "Path-Enhanced" Multimedia Databases via the Database Upload 37, which incorporates a conventional browser-like user interface, as well as networking and security protocols. The Databases 12 may later be queried using predicates based on time, geography, or other information. Both contribution and query access to a given database may be restricted to a single User 14 or allowed for arbitrarily large groups of people. Applications, methods, and data structures related to these databases are discussed in greater detail in the referenced co-pending application entitled "Indexed Database Structures and Methods for Searching Path-Enhanced Multimedia"

Geo-referenced Information Databases 34 contain one or more types of data that are organized by location and/or time but typically lack the explicit path information that is found for multimedia in the "Path-Enhanced" MultiMedia Databases 12. That is, each record in a Geo-referenced Information Database 34 is annotated with time and/or location, but is not explicitly associated with a geo-temporal path. The Geo-referenced Information Databases 34 might contain recorded location- and/or time-tagged weather (temperature, precipitation, etc.) data, news articles, or stock photos of landmarks, typical scenes, and people of various cultures. For example, a user may query one such database for stock photos with location tags along the recorded PEM path traveled for a given trip, in order to augment this Scrapbook Object 10 with some professional pictures of known landmarks.

Referring to FIG. 6, one embodiment of a protocol for searching Geo-referenced Information Databases 34, in the context of displayed "path-enhanced" multimedia, proceeds as follows:

1) Because data may not exist within a given database to support the same queries for all world regions or time intervals, the user must first discover what types of information are available from a database for his geographic and temporal region of interest. The user therefore begins by connecting to a database of information organized by time and/or location, or to a service managing one or more such databases, and providing the service or database with an overall geographic designation and/or geo-temporal bounding box that includes all of the PEM data in the current view (Step 100). This bounding box may be generated in part by Computational Geometry Engine 36 using Time and Location information 38, stored in the Scrapbook Object 10, that is relevant to the current view.

2) The service or database returns key phrases (shown as Query Responses 44) describing the types of information it makes available for the geographic region or geo-temporal window of interest. These key phrases (shown as Filtered Query Responses 50) are forwarded to Renderer 22 for subsequent display to the user via Display 26 (Step 102). Example key phrases representing types of information include "restaurants", "tourist landmarks", "webcam views", "other people's recent photos", "overlay maps", "folk music from the area", "stock photos", "news headlines", and "temperature data". The key phrases may optionally be modified with parameter ranges, such as "within the last 20 years", or "through year 2000".

3) The user then selects the information type of interest (Step 104). He may also further refine the query by specifying parameters (such as "within the last 20 years" or "today") or by using standard text-based query modifications, such as the "AND", "WITHOUT", or "ALL" operators used in many Internet web page and document search software applications.

4) The user next designates, via a graphical interface, some geo-temporal zone of interest in which to search for the desired information, using one or more of the types of geo-temporal proximity criteria described below (Step 106).

5) The user submits the query, and the database service returns information satisfying it, if any is found. The Computational Geometry Engine 36 aids in the query construction and in the filtering of the returned response, as described in more detail below. The returned information is rendered in the Display 26 so that it is geographically aligned with the currently displayed view of the PEM (Step 108). For example, if the query returns photographs of "geo-referenced" landmarks, and if the user is currently working with a map-based view of the PEM, icons are drawn at the locations associated with each of the landmark photographs. In addition, the search results are rendered with a special appearance that distinguishes them as query results that have not yet been integrated into the Scrapbook Object 10. For the above example, the icons may be drawn with darker shading, or with partial transparency, or with a "question mark" indicator, in order to distinguish them from icons representing original MediaFiles in the PEM, whose icons are not rendered in this special way.

6) The user may optionally use a graphical interface to review the returned information. This process may include clicking on icons representing multimedia in order to play that multimedia, or scrolling a returned map to view its characteristics (Step 110).

7) After the optional review process, the user selects the information he wants to integrate into the Scrapbook Object 10 (Step 112). The user also specifies whether the returned information should be integrated into all or only some of the views of the PEM. Alternatively, the user may choose to integrate "geo-referenced" information into the Map data structure associated with some view, rather than directly associating it with GeoTemporalAnchors in the PEM. In this latter case, the user is in effect augmenting or editing the map overlay for the PEM, rather than the PEM itself.

8) After selection of the desired information is completed, the user may use the graphical interface to request that the remaining, undesired information returned by the query be removed from the rendering of the current view of the PEM.

The user may then return to any of steps 1), 2), 3), or 4) above to begin a new query.

Although the above example is described such that queries are provided via Internet services, the same mechanisms may be used for databases provided from other media storage devices. For example, optical recorded media such as DVDs or CDs may be used in conjunction with PCs to provide access to third party databases.

The geo-temporal proximity criteria employed in step (4) above may be generated in many ways using the PEM data, and many of these types of criteria cannot be constructed from the simple time and/or location annotations of multimedia used in other current systems. That is, this invention's association of path information to the multimedia enables the construction of novel types of interesting and useful geo-temporal proximity criteria for "geo-referenced" database queries. The Computational Geometry Engine 36 is instrumental in providing translations and interfaces between these path-based geo-temporal proximity criteria and the bounds-oriented query styles used by typical Geo-referenced Information Databases 34. Some examples of proximity search criteria that may be used in step (4) above and embodiments of techniques for implementing them include:

Criterion 1: Find information, such as multimedia, that is associated with locations within some distance "d" of at least one Geo TemporalAnchor 208 of the path in a PEM.

Search Technique 1: Because many conventional Geo-referenced Information Databases 34 are capable only of accepting queries that specify regions and times of interest defined by spatial and temporal bounds, it may not be possible to directly submit to some databases the above criterion, which is predicated on proximity to some PEM path. In such cases, the Computational Geometry Engine 36 first analyzes query requests (Queries 32) made by users in the context of displayed "path-enhanced" multimedia (e.g. in a map-based view) then gathers the relevant Time and Location Data 38 from the PEM data in Scrapbook Object 10. The Computational Geometry Engine 36 then generates suitable queries (Filtered Queries 40), in terms of spatial and temporal bounds, to be sent to the Geo-referenced Information Databases 34, and, finally, refines the results returned by the databases to generate Filtered Query Responses 50 to satisfy the (possibly) path-oriented proximity constraints specified by the user. An exemplary method by which the Computational Geometry Engine 36 may generate queries and filter the database search results based on proximity to a PEM path proceeds as follows (See also FIG. 7):

a) Compute the geographical bounding box for the entire path, increase it on all sides by the separation threshold "d", and formulate a query based on this bounding box. Send the query (Filtered Query 40) to the service, and receive results (Query Responses 44) of all information associated with that bounding box (Step 120).

b) Consider the path (using Time and Location Data 38) to be embedded in a digital image of a map for the current view of the PEM, and calculate the shortest distance (in pixels) from the path to each pixel in the bounding box (Step 122). A chamfer distance transform algorithm may be used to approximately compute these distance values in an efficient manner; for more details, see the referenced co-pending application "Indexed Database Structures and Methods for Searching Path-Enhanced Multimedia"

c) For each item of "geo-referenced" information returned by the query, find the pixel in the image corresponding to the current view of the PEM that corresponds to the location associated with the information (Step 124).

d) If the distance at that pixel is more than "d", the information is filtered out of the query result. Only information mapping to pixels with distances to the path less than or equal to "d" are presented for review by the client (Step 126).

Criterion 2: Find information, such as multimedia, within some distance "d" of at least one GeoTemporalAnchor of one or more specified subsections of the path.

Search Technique 2: The bounding box methodology set forth for criterion (1) may be slightly modified to implement this, specifically by restricting the bounding box computation in step (a) and the chamfer process in step (b) to operate on only a subset of the GeoTemporalAnchors in the path.

Criterion 3: Find information, such as multimedia, that is within some distance "d" of a particular point on the path.

Search Technique 3: A query for all information within the boundary square of width "2d" centered on the point of interest is sent to the database. The query results are further refined to exclude information pertaining to locations outside the circle of radius "d" centered on the point of interest.

Criterion 4: Find information, such as multimedia, whose associated location is within a distance "d" and whose associated time is within an interval of time "i" of at least one point on the PEM path.

Search Technique 4: This enforces both spatial and temporal proximity between the PEM and the information returned by the query. As for criterion (1) above, we must devise a method for implementing such queries on Geo-referenced Information Databases 34 that only accept geographic and temporal bounds as query parameters. One method via which the Computational Geometry Engine 36 may generate queries and filter database search results, based on geographic and temporal proximity to a PEM path, proceeds as follows (See also FIG. 8):

a) Compute the spatial bounding box of the path, as well as the temporal bounding interval of the path (Step 130). Send the query with these bounds to the service, and receive results of all information associated with that bounding box and time interval.

b) For each returned result, search for the subsection of the path whose GeoTemporalAnchors are within time interval "i" of the time associated with the result (Step 132).

c) For each GeoTemporalAnchor in this subsection, compute the distance between the GeoTemporalAnchor and the location associated with the result. If the distance to no GeoTemporalAnchor in the subsection is less than "d", the information is filtered out of the query (Step 134).

Criterion 5: Find information, such as multimedia, whose associated location is within a distance "d" and whose associated time is within an interval of time "i" of at least one point on one or more subsections of the PEM path, and whose associated time is within some interval "i" of at least one of these same points.

Search Technique 5: The methodology of criterion (4) may be slightly modified to implement this, specifically by restricting the search for the path subsection in step (b) to the set of subsections specified in the present criterion.

Criterion 6: Find information, such as multimedia, whose associated location is within a distance "d" and whose associated time is within a time interval "i" of a particular GeoTemporalAnchor of the PEM path.

Search Technique 6: The methodology of criterion (3) may be used to implement this, with the additional step of checking that each filtered query result has an associated time that is different from that of the particular GeoTemporalAnchor by less than "i".

Criterion 7: Find information near a fictitious path that is drawn on a Map by the user. This might be used to search for information and multimedia relevant to places near a planned travel route.

Search Technique 7: After the user draws the path via the graphical interface, the query may be implemented via the method of criterion (1). If desired, such query criteria can also be limited to one or more specific windows in time.

Criterion 8: Find information near, in space and/or time, to the union of locations and/or times associated with multimedia in the PEM.

Search Technique 8: This can be used, among other things, for cross-media queries, for example, "find videos for places where I have audio". Such information may be found via method (5) above, using the multimedia capture times and locations as the subset of path points of interest.

Criterion 9: Find information near a set of stop points associated with the PEM.

Search Technique 9: Path data may be processed to detect "stop" points, where the person capturing the data spent significant time in a limited geographical location. If such path processing is done, one can then search for multimedia or other information associated with locations and times near these "stop" points via method (5) above, using the detected "stop" points as the subset of path points of interest.

Criterion 10: Find information within some bounding box in the map, or near one or more points in the map, without regard to PEM path proximity.

Search Technique 10: This method degenerates to standard "geo-referenced" database queries and returns, for example, all items that may be seen in the bounding box of the map overlay. For such queries, since they are not at all based on a path or a PEM, it may be preferable that the returned information becomes integrated with the Map component of a view of the PEM, rather than with the PEM itself. In effect, the returned information is used to edit and augment the Map, thereby affecting the underlying context in which a PEM is rendered, but without being linked directly to any elements of the PEM path.

In the methods described above, a slider may be used to control the "proximity" thresholds, such as "d" and "i", in order to interactively include or exclude multimedia returned by the query. Provision can also be made to edit an existing path or to construct a new path prior to generation of search queries by any of the proximity criteria listed above.

The mechanisms described above for viewing, modifying, and interacting with the Scrapbook Object 10 can also be used for sharing and commenting on scrapbook objects. For instance, a Scrapbook Object 10 representing a particular vacation one has taken may be shared with one or more other people, such as friends or family of the Scrapbook Object 10 author, in all of the same ways that any other digitized computer file may be shared. For example, it may be sent via email, transferred via the Internet using HTTP or FTP, or written to an archival device such as a DVD or CD that is then physically transferred to the other people. Each of these other people may use the same interface described above to browse the trip described by the Scrapbook Object 10, to form a commentary on the trip, to edit the Scrapbook Object 10 to include a modified path that would make a great next vacation, and so on. The other people may then send back the edited Scrapbook Object 10 for display and possible further editing or publication of an automated presentation. Such an exchange can also be performed using a server upload mechanism or a peer-to-peer sharing mechanism, and synchronous sharing methods (such as are already used to interact with an online document or slide presentation) are also possible. Moreover, assuming that one of the non-spatial attributes for the path and multimedia annotations is "Editor" and/or "Edit Time", the modifications may be tracked over time, so that a current viewer of the Scrapbook Object 10 may either view the edited Scrapbook Object 10 or may request to view just what was created or added by a specific individual views containing just the modifications made by specific individuals are easily created and stored by automated means.

Much of the functionality described above can be implemented on a system (such as a desktop PC) that is physically separate from the recording device and that possesses display, computational, and storage resources, as well as an interface with transfer protocols for downloading data from the recording device. The system can also possess an Internet connection that facilitates the sharing of PEM, and that allows for connecting to various databases that may be searched to aid in the augmentation and exploration of the "path-enhanced" multimedia.

In other embodiments, at least a portion or all of the system as shown in FIG. 3 can be implemented locally or remotely to the User 14. For instance, in one embodiment, at least the Path Processor 18, scrapbook object 10, generated default views 20, Renderer 22, and User Control 28 (or processes performed by these elements) may be implemented local to the user within, for example, a discrete device such as a desktop PC or a multimedia device.

In another embodiment, at least a portion of the elements or processing steps may be implemented remotely. In one example, the User Control 28 can be performed locally through a web-based user interface. The web-based interface can allow a user to interact with a web site to facilitate uploading of the user's PEM data recording to a remote server having computing capabilities to remotely perform the functions of blocks 18, 10, 20, 22. In response to a user specifying a view selection via the web-based interface, the server may then perform the functions of blocks 18, 10, 20, 22 to provide downloadable PEM data via the interface to allow the user to view the user's PEM data on Display 26 according to their selected view.

Other implementations and enhancements to the disclosed exemplary devices will doubtless be apparent to those skilled in the art, both today and in the future. For example, when a recording device with a relatively small viewing screen supplies the input "path-enhanced" multimedia data, certain basic editing and viewing functions derived from those described above may be implemented in the actual recording device itself using its built-in viewing screen and a simplified user interface.

What is claimed is:

1. A multimedia system comprising:

storage area having a data structure including at least one first data object for storing "path-enhanced" multimedia (PEM) data including essentially continuous path information associated with a path traversed and multimedia data associated with points along the path, and at least one second data object for storing information corresponding to at least one view which defines the manner in which at least a portion of the PEM data is to be displayed by the system;

user control for receiving user input including selection of one of the at least one view;

renderer for receiving first and second data object types dependent on the user input view selection and for generating display data including the at least a portion of the "path-enhanced" multimedia data corresponding to the view selection;

display for displaying the display data.

2. A machine-implemented multimedia method, comprising:

accessing path-enhanced multimedia (PEM) data including definitions of spatiotemporal paths and links between multimedia objects in a collection and respective points on the spatiotemporal paths;

generating at least one view data structure, each view data structure specifying a respective perspective for visualizing at least a portion of the PEM data; and storing the at least one view data structure on a machine readable medium.

3. The method of claim 2, wherein at least one spatiotemporal path includes at least one point unlinked to a respective multimedia object.

4. The method of claim 2, wherein at least one view data structure corresponds to a map-type view specifying a geographical perspective for visualizing a specified portion of the PEM data.

5. The method of claim 4, further comprising computing spatial bounds of a geographic region encompassing the specified portion of the PEM data.

6. The method of claim 5, further comprising retrieving a map of a region encompassing the computed spatial bounds.

7. The method of claim 2, wherein at least one view data structure corresponds to a calendar-type view specifying a temporal perspective for visualizing a specified portion of the PEM data.

8. The method of claim 7, further comprising retrieving a name of at least one location near a spatiotemporal path within the specified portion of the PEM data.

9. The method of claim 2, wherein at least one view data structure corresponds to a media-type view specifying a media-type perspective for visualizing a specified portion of the PEM data.

10. The method of claim 9, wherein the media-type perspective organizes multimedia objects associated with the specified portion of the PEM data into sections by multimedia type.

11. The method of claim 10, further comprising retrieving a name of at least one location near a spatiotemporal path point linked to a respective one of the associated multimedia objects.

12. The method of claim 2, wherein a given view data structure specifies at least one restriction confining the corresponding visualization perspective to a respective portion of the PEM data.

13. The method of claim 12, wherein the given view data structure specifies at least one of a temporal restriction, a spatial restriction, and a multimedia object attribute restriction on the corresponding visualization perspective to a respective portion of the PEM data.

14. The method of claim 13, wherein the multimedia object attribute restriction relates to a user-designated label associated with at least one multimedia object.

15. The method of claim 13, wherein the multimedia object attribute restriction relates to a user-designated user access restriction associated with at least one of a multimedia object and a spatiotemporal path.

16. The method of claim 2, wherein a given view data structure specifies at least one parameter describing a respective rendering style for visualizing at least a portion of the PEM data.

17. The method of claim 16, wherein the given view data structure is associated with a map data structure specifying a map image and parameters for rendering the map image.

18. The method of claim 2, wherein a given view data structure specifies all multimedia objects encompassed by the corresponding visualization perspective.

19. The method of claim 2, further comprising processing at least a portion of a spatiotemporal path defined by the PEM data.

20. The method of claim 19, wherein each spatiotemporal path includes a temporally ordered sequence of points, each point on a given spatiotemporal path being associated with time data and at least one point on a given spatiotemporal path additionally being associated with geographic location data.

21. The method of claim 20, wherein processing PEM data comprises computing geographic location data for a given point unassociated with geographic location data based on geographic location data associated with points neighboring the given point.

22. The method of claim 19, wherein processing PEM data comprises simplifying a portion of a spatiotemporal path.

23. The method of claim 19, wherein processing PEM data comprises smoothing a portion of a spatiotemporal path.

24. The method of claim 19, wherein processing PEM data comprises identifying spatiotemporal path points associated with a velocity measure near zero for a period longer than a threshold period.

25. The method of claim 24, wherein rendering PEM data comprises rendering an ordered arrangement of temporal descriptors corresponding to temporal data associated with the given view data structure.

26. The method of claim 25, further comprising rendering a name of a location corresponding to a respective one of the rendered temporal descriptors in accordance with the given view data structure.

27. The method of claim 25, further comprising rendering a label associated with a multimedia object corresponding to a respective one of the rendered temporal descriptors in accordance with the given view data structure.

28. The method of claim 24, wherein rendering PEM data comprises rendering labels associated with multimedia objects linked to the given data structure organized into sections by media type.

29. The method of claim 28, further comprising rendering a name of a location corresponding to a respective one of the rendered labels in accordance with the given view data structure.

30. The method of claim 24, wherein the rendering of the PEM data is responsive to rendering restrictions associated with the given view data structure.

31. The method of claim 2, further comprising rendering PEM data in accordance with a given one of the stored view data structures.

32. The method of claim 31, wherein rendering PEM data comprises rendering an image of a map specified by the given view data structure.

33. The method of claim 32, further comprising rendering over the map image a graphical representation of at least one spatiotemporal path corresponding to the specified portion of the PEM data.

34. The method of claim 33, wherein the rendered spatiotemporal path portions are represented by a temporally ordered sequence of connected points.

35. The method of claim 32, further comprising rendering a graphical representation of a given multimedia object near a location on a rendered spatiotemporal path corresponding to a capture location associated with the given multimedia object.

36. The method of claim 35, wherein the given multimedia object is represented by an icon suggestive of a multimedia type of the given multimedia object.

37. The method of claim 36, wherein the multimedia object representation is a reduced resolution version of an image associated with the given multimedia object.

38. The method of claim 36, wherein the multimedia object representation is a text label associated with the given multimedia object.

39. The method of claim 35, further comprising rendering a graphical indication of a field-of-view of a visual multimedia object.

40. The method of claim 39, wherein the field-of-view indication corresponds to an arrow.

41. The method of claim 40, wherein the arrow has an orientation corresponding to an orientation of a camera relative to a geographical location in the map image.

42. The method of claim 40, wherein the arrow has a length representative of a distance to a point of focus of a camera.

43. The method of claim 39, wherein the field-of-view indication indicates a spatial extent of the visual multimedia object field-of-view.

44. The method of claim 39, wherein the field-of-view indication indicates a tilt angle of the visual multimedia object field-of-view.

45. The method of claim 39, wherein the field-of-view indication corresponds to a union of multiple fields-of-view captured by respective video frames of a visual multimedia object.

46. The method of claim 35, further comprising rendering a media file associated with the given multimedia object in response to user selection of the multimedia object representation.

47. The method of claim 2, further comprising providing a user interface for interacting with PEM data.

48. The method of claim 47, further comprising enforcing access restrictions associated with PEM data.

49. The method of claim 48, wherein enforcing access restrictions comprises denying unauthorized users access to at least one of PEM data and multimedia objects when corresponding access restrictions apply.

50. The method of claim 47, wherein the user interface presents a map-based interface for a map-type view.

51. The method of claim 47, wherein the user interface enables an authorized user to edit PEM data.

52. The method of claim 51, wherein the user interface enables an authorized user to edit access restrictions associated with PEM data.

53. The method of claim 51, wherein the user interface enables an authorized user to associate a multimedia object with a spatiotemporal path.

54. The method of claim 51, wherein the user interface enables an authorized user to disassociate a multimedia object from a spatiotemporal path.

55. The method of claim 51, wherein the user interface enables an authorized user to modify a spatiotemporal path.

56. The method of claim 55, wherein the user interface enables an authorized user to modify an attribute of a portion of the spatiotemporal path.

57. The method of claim 47, wherein the user interface enables an authorized user to associate a label with PEM data.

58. The method of claim 47, wherein the user interface enables an authorized user to edit a stored view data structure.

59. The method of claim 47, wherein the user interface enables an authorized user to create a new view data structure.

60. The method of claim 47, wherein the user interface enables an authorized user to delete a stored data structure.

61. The method of claim 47, further comprising maintaining a record of user interactions with PEM data.

62. The method of claim 47, wherein the user interface enables an authorized user to browse PEM data.

63. The method of claim 47, wherein the user interface enables an authorized user to retrieve non-PEM data from a database.

64. The method of claim 63, wherein the user interface enables an authorized user to associate PEM data with non-PEM data retrieved from the database.

65. The method of claim 63, wherein the user interface enables a user to specify a category of non-PEM data to retrieve from the database, and further comprising constructing at least one database query based on the user-specified non-PEM data category.

66. The method of claim 65, wherein constructing at least one database query comprises computing a bounding window encompassing a portion of the PEM data.

67. The method of claim 66, wherein the computed bounding window at least approximately corresponds to a PEM data portion being presented to the user through the user interface.

68. The method of claim 66, further comprising formulating the at least one database query in terms of at least one parameter defining the computed bounding window selected from a spatial parameter, a temporal parameter, and a spatiotemporal parameter.

69. The method of claim 65, further comprising associating non-PEM data returned in response to the at least one database query to a currently rendered view of the PEM data.

70. The method of claim 63, wherein the database stores data related to one or more data types selected from: place names; landmark names; names of business establishments; news articles; weather data; parameters for network connections to real-time views from video cameras connected to a network; hotel names; hotel room rates; hotel room availability information; restaurant names; and restaurant cuisine types.

71. The method of claim 47, wherein the user interface enables an authorized user to restrict presentation of PEM data along one or more PEM data attribute dimensions.

72. The method of claim 71, wherein the user interface enables an authorized user to restrict presentation of PEM data along a spatial dimension.

73. The method of claim 71, wherein the user interface enables an authorized user to restrict presentation of PEM data along a temporal dimension.

74. The method of claim 71, wherein the user interface enables an authorized user to restrict presentation of PEM data along a user-designated label dimension.

75. A multimedia system, comprising at least one processing module operable to:

access path-enhanced multimedia (PEM) data including definitions of spatiotemporal paths and links between multimedia objects in a collection and respective points on the spatiotemporal paths;

generate at least one view data structure, each view data structure specifying a respective perspective for visualizing at least a portion of the PEM data; and store the at least one view data structure on a machine readable medium.

76. A machine-readable medium storing machine-readable instructions for causing a machine to:

access path-enhanced multimedia (PEM) data including definitions of spatiotemporal paths and links between multimedia objects in a collection and respective points on the spatiotemporal paths;

generate at least one view data structure, each view data structure specifying a respective perspective for visualizing at least a portion of the PEM data; and store the at least one view data structure on a machine readable medium.

77. A multimedia system, comprising:

a machine-implemented accessing module configured to access path-enhanced multimedia (PEM) data including definitions of spatiotemporal paths and links between multimedia objects in a collection and respective points on the spatiotemporal paths;

a machine-implemented view generating module configured to generate at least one view data structure, each view data structure specifying a respective perspective for visualizing at least a portion of the PEM data; and a machine-implemented rendering module configured to render a user interface configured to present the PEM data as specified by the at least one view data structure.

* * * * *